United States Patent [19]
Getgen

[11] 4,317,194
[45] Feb. 23, 1982

[54] CARRIER FREQUENCY SPECTRUM GENERATOR USING LOGIC LEVEL INPUT PULSES

[75] Inventor: Lawrence E. Getgen, Redwood City, Calif.

[73] Assignee: GTE Automatic Electric Laboratories, Inc., Northlake, Ill.

[21] Appl. No.: 99,379

[22] Filed: Dec. 3, 1979

[51] Int. Cl.³ .............................................. H04J 1/06
[52] U.S. Cl. ...................................... 370/121; 370/70; 328/27
[58] Field of Search ........................... 370/69, 70, 110; 328/27, 16, 17, 18

[56] References Cited

U.S. PATENT DOCUMENTS

| | | | |
|---|---|---|---|
| 3,146,400 | 8/1964 | Perlman | 328/27 |
| 3,247,468 | 4/1966 | Pintell | 328/27 |
| 3,668,327 | 6/1972 | Euchner et al. | 370/69 |
| 3,815,030 | 6/1974 | Morrison | 328/27 |

*Primary Examiner*—Douglas W. Olms
*Attorney, Agent, or Firm*—Leonard R. Cool

[57] ABSTRACT

An inverter accepts the true form of a high-frequency signal at its input and provides the complement thereof at its output. The true form is applied to a first input of a first NAND-gate and the complementary form is applied to a first input of a second NAND-gate. A second signal, having a repetition rate which is set, for example, by the channel spacing required in an FDM carrier system, is applied to the second inputs of said first and second NAND-gates. The second signal is thereby alternately switched between the first and second output terminals of said NAND-gates at a rate equal to the frequency of the high-frequency signal. The first and second output terminals of said NAND-gates are connected to the first and second end terminals, respectively, of the primary winding of an output transformer. The end terminals of the secondary winding of said transformer are connected to the load or utilization device. The output signal comprises a spectrum having a sin x/x envelope centered at the high-frequency $w_c$. Spectral rays occur at the high frequency $w_c$ and are disposed on either side of $w_c$ at intervals equal in frequency to the pulse rate of said second signal.

6 Claims, 4 Drawing Figures

CARRIER FREQUENCY SPECTRUM GENERATOR USING LOGIC LEVEL INPUT PULSES

BACKGROUND OF THE INVENTION

This invention relates to frequency generators and, more particularly, to improved method and apparatus for generating a plurality of carrier frequencies symmetrically disposed about a high-frequency signal.

In many multiplex communication systems, a number of closely spaced carrier frequencies are required to provide the basic separation between carrier channels. For example, in frequency division multiplex systems which employ single sideband modulation techniques, carrier frequencies often are spaced at 4 kHz intervals. Further, in order to take advantage of the light weight and small size of present day polylithic crystal filters, such carrier frequencies are required to be in the 8 mHz range. Of course, the carriers could be obtained by providing a separate oscillator for each desired frequency. However, this is not only expensive but introduces a problem of stabilizing a plurality of units rather than reducing this stability problem to a single unit or perhaps one or two units. Another technique is to use a high-frequency as a carrier and to use a modulating frequency which is equal to the channel spacing to modulate the high-frequency and provide harmonically related signals at its output. A disadvantage of this technique is the number of components required to obtain the desired result.

SUMMARY OF THE INVENTION

Apparatus for deriving a plurality of carrier frequencies that are spaced from a first predetermined frequency by an amount equal to the fundamental frequency of a second predetermined frequency, and multiples thereof, includes a device for producing true and complementary logic level signals of said first predetermined frequency. A switching arrangement is responsive to the logic level signals and alternately connects the second predetermined frequency between first and second output terminals at a rate which is equal to the first predetermined frequency. A coupling means interconnects the output of said switching arrangement with a utilization device.

BRIEF DESCRIPTION OF THE DRAWING(S)

DETAILED DESCRIPTION OF THE INVENTION

Figure 1:
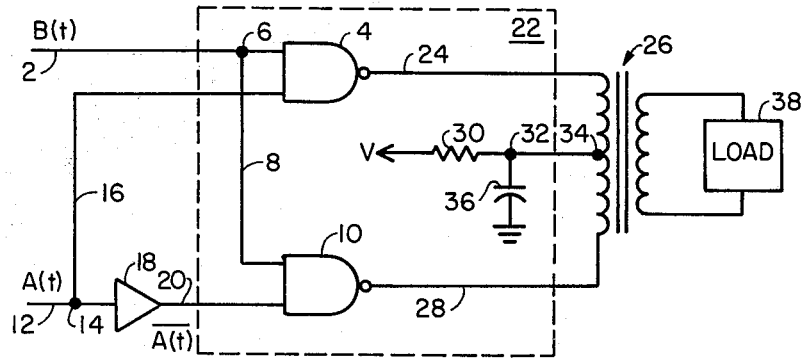
FIG. 1 is a schematic diagram of one embodiment of the invention.

Referring now to FIG. 1, a switching circuit 22 includes a first coincidence circuit 4 and a second coincidence circuit 10 each having one input terminal adapted to receive the modulating frequency $B_t$ along path 2. A high-frequency signal $A_t$ is applied to path 12 and via path 16 directly to a second input of coincidence gate 4. Inverter 18 provides the complement of the true form of the high-frequency signal on path 20 which is connected to a second input of coincidence circuit 10. The modulating signal $B_t$ will most often have a pulse repetition frequency equal to the separation between channels, for example of a carrier system. In many such applications the pulse repetition frequency would be 4 kHz, but could be some other frequency depending upon the particular application. Many present day carrier systems make use of polylithic crystal filters which conveniently operate at frequencies in the 8 to 10 MHz range. In the initial modulation step, a plurality of carriers, in say the 8 MHz range, must be separated one from the other by the nominal channel bandwidth of 4 kHz. Thus, $A_t$ could be 8 MHz and $B_t$ would be 4 kHz. As seen by this example, the high-frequency $A_t$ will generally be considerably higher, by several orders of magnitude, than the modulation frequency $B_t$.

Figure 2:
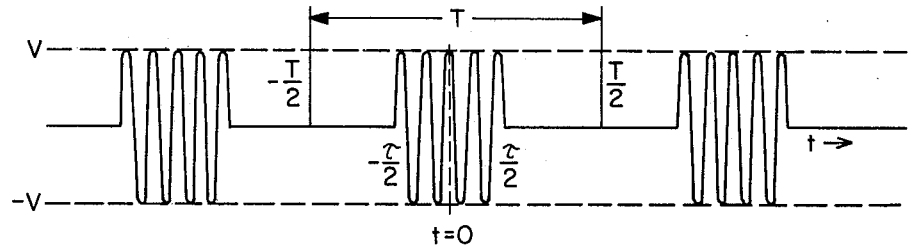
FIG. 2 is a waveform diagram illustrating the time-domain output of the circuit of the invention.
Figure 3:
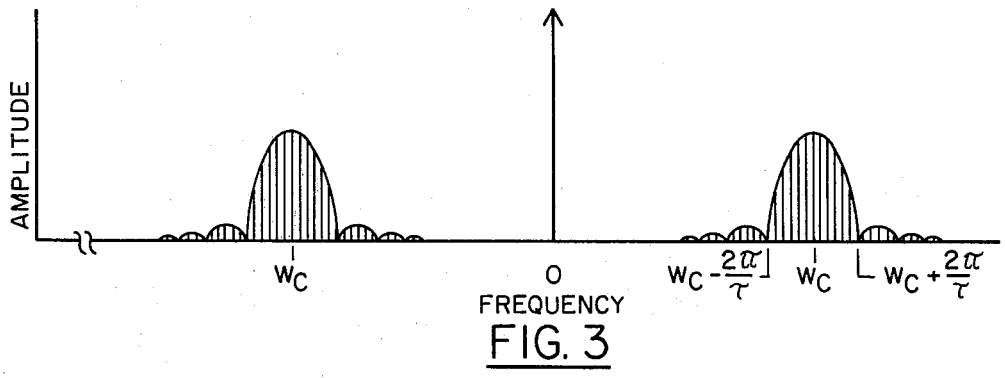
FIG. 3 is a waveform diagram illustrating the frequency-domain output from the circuit of FIG. 1.

The signal appearing on paths 24 or 28 from coincidence gates 4 and 10, respectively, depend upon the states of the high-frequency and the modulation frequency. With respect to the modulation frequency $B_t$, it should be noted that a return to zero (RZ) pulse is used and the spectral distribution is inversely related to this pulse width as is shown in FIG. 3. To more clearly understand what is happening here, let us assume that the modulating frequency has a pulse repetition frequency of 4 kHz and a pulse width of 2 $\mu$s. The high-frequency is 8 MHz and, thus, in the 2 $\mu$s period during which a high would appear on path 2 via junction 6 to one input of coincidence gate 4, and path 8 to one input to coincidence circuit 10, sixteen alternations of the high-frequency signal will occur. Because NAND-gates are used for the coincidence circuits, the outputs on paths 24 and 28 will be binary 0 only when a binary 1 appears on both inputs to the gate. Therefore, the high-frequency signal will cause the signal to be switched between paths 24 and 28 at the high-frequency rate during the 2 $\mu$s pulse interval. The time-domain characteristic is shown in FIG. 2, which is not to scale. FIG. 3 shows the spectral rays and the spectral distribution which is obtained from the circuit of FIG. 1. As with FIG. 2, FIG. 3 is not to scale, but it should be understood that the spectral rays shown as the vertical lines would be spaced, for example, at 4 kHz intervals disposed about the carrier frequency $w_c$. As may be seen in FIG. 3, the amplitudes of the spectral rays decrease with increasing frequency from the carrier. This "roll-off" is a function of the pulse width of the modulation frequency $B_t$. In a number of cases, it is desired to have 12 spectral rays adjacent to and including the high-frequency $w_c$; and with reasonably high attenuation of frequencies further removed in order to reduce filter requirements. For our example, if $B_t$ is a 2 $\mu$s pulse, the 12 desired spectral rays are essentially unattenuated and, in fact, the useable spectrum extends considerably beyond this range. However, if the pulse width of the modulation frequency is increased to 8 $\mu$s, the extreme signal of the desired 12 is attenuated by about 1.6 dB in respect to the high-frequency $w_c$ and those further removed are further attenuated, with the attenuation being in the order of 35 dB or more. The attenuation will be significant for frequencies removed from $w_c$ by $w = 2\pi/\tau$ or more, where $\tau$ is the width of the low frequency pulse.

In order to obtain a desired output level into the load, the NAND-gates 4 and 10 are of the open collector, high voltage type such as the 7426 or 7438. Alternatively, a conventional gate driving a high voltage buffer such as the 7406 or 7407 may be employed. Resistor 30 acts as a collector load for these open-collector devices. The capacitor 36 serves to bypass the output current path. It is to be noted that the 7046 and 7047 high voltage buffers are designed for a 30 volt collector limit, and, therefore, the circuit can develop carriers that have a reasonably high output level. In order to facilitate the connection of the voltage source V to the open collector circuits of NAND-gates 4 and 10, a center tap on transformer 26 is employed as illustrated. The transformer provides isolation between the supply voltage and simplifies the coupling of the carrier signals to the load 38. Because a transformer offers a low impedance, its use provides a means of coupling the ac output signal to the load without adding an unwarranted voltage loss.

Load 38 may consist of a series of filters which are used for the selection of the spectral rays, carrier frequencies, to be applied subsequently to modulators that are to be used in the multiplexing of some information bearing signal. Other loads may be used. For example, amplifiers which enhance the signal prior to selection may constitute the load.

Figure 4:
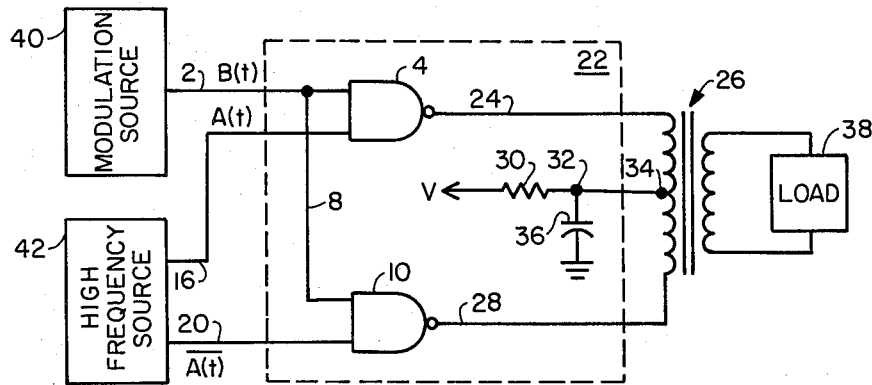
FIG. 4 is a schematic diagram of another embodiment of the invention.

FIG. 4 is different from FIG. 1 in that the sources 40 and 42 have been incorporated. Here the high-frequency source 42 is shown to have the true and complementary outputs. Therefore, no inverter is required. Modulation source 40 simply applies the proper pulse repetition rate and pulse width directly to one input of each of the NAND-gates 4 and 10.

While the invention has been particularly shown and described with reference to preferred embodiments thereof, it will be understood by those skilled in the art that change in form and detail may be made therein without departing from the spirit and scope of the invention.

What is claimed is:

1. Apparatus for deriving a plurality of carrier frequencies that are spaced from a first predetermined frequency by an amount equal to the fundamental frequency of a second predetermined frequency, and multiples thereof, which comprises:

means for producing true and complementary logic level signals from said first predetermined frequency and making said true and complementary signals available, respectively, at first and second output terminals, said producing means having an input terminal adapted to receive said first predetermined frequency;

switching means for alternately connecting the second predetermined frequency between third and fourth output terminals at a rate equal to the first predetermined frequency, said switching means having first and second input terminals adapted for connection to said first and second output terminals, respectively, of said producing means, and having a third input terminal adapted to receive the second predetermined frequency; and coupling means for interconnecting said switching means with a utilization device, said coupling means having first and second input terminals connected to the third and fourth output terminals, respectively, of said switching means, and having first and second output terminals.

2. Apparatus as set forth in claim 1 wherein said means for producing further comprises:

means for inverting the first predetermined frequency to obtain the complement thereof, said inverting means having an input terminal and an output terminal connected, respectively, to said input terminals and second output terminal of said producing means.

3. Apparatus as set forth in claim 2 wherein said means for producing further comprises:

delay means for providing a delay to the true signal which is equal to the delay caused by said inverting means, said delay means having an input terminal and an output terminal connected, respectively, to the input terminal and the first output terminal of said producing means.

4. Apparatus as set forth in claim 3 wherein said coupling means further comprises:

a transformer having a primary winding with first and second end terminals thereof, respectively, connected to the third and fourth terminals of said switching means, and a secondary winding having third and fourth end terminals for connection to said utilization device.

5. Apparatus as set forth in claim 4 wherein said switching means further comprises:

a first NAND-gate having a first input terminal connected to the first input terminal of said switching means, having a second input terminal connected to the third input terminal of said switching means, and having an output terminal connected to the third output terminal of said switching means; and a second NAND-gate having a first input terminal connected to the second input terminal of said switching means, having a second input terminal connected to the second input terminal of said first NAND-gate, and having an output terminal connected to the fourth output terminal of said switching means.

6. A carrier frequency spectrum generator comprising:

a carrier frequency source which produces a pair of logic level signals each at a first predetermined frequency, the first signal of said pair being the true form which is available at a first output terminal, and the second signal of said pair being the complementary form which is available at a second output terminal;

a modulation frequency source for providing a second signal, operating at a second predetermined pulse repetition rate, at an output terminal;

switching means for alternately switching the second signal between third and fourth output terminals at a pulse rate equal to the predetermined frequency of said first carrier frequency source, said switching means having first and second input terminals adapted, respectively, for connection to the first and second output terminals of said carrier frequency source, and having a third input terminal adapted for connection to the output of said modulation frequency source; and coupling means for interconnecting said switching means with a utilization device, said coupling means having first and second input terminals, respectively, connected to the first and second input terminals of said switching means, and having first and second output terminals.

* * * * *